United States Patent [19]
Kinoshita

[11] Patent Number: 6,100,962
[45] Date of Patent: Aug. 8, 2000

[54] INSTALLATION GUIDE MECHANISM FOR PAPER ROLL AND GUIDE APPARATUS FOR PAPER MAGAZINE

[75] Inventor: Yasunori Kinoshita, Izumiohtsu, Japan

[73] Assignee: Noritsu Koki Co., Ltd., Wakayama, Japan

[21] Appl. No.: 09/115,735

[22] Filed: Jul. 15, 1998

[30] Foreign Application Priority Data

Jul. 15, 1997 [JP] Japan ..................................... 9-189821
Jul. 15, 1997 [JP] Japan ..................................... 9-190097

[51] Int. Cl.[7] ............................ G03B 27/58; G03B 27/00
[52] U.S. Cl. ............................................... 355/72; 355/407
[58] Field of Search ................................. 355/47, 65, 72, 355/407; 242/563.1, 555; 400/88, 55, 208

[56] References Cited

U.S. PATENT DOCUMENTS

| 4,111,379 | 9/1978 | Luscher | 242/71.1 |
| 5,447,446 | 9/1995 | Pou | 400/88 |
| 5,584,446 | 12/1996 | Delmore et al. | 242/555 |
| 5,667,318 | 9/1997 | Tanno et al. | 400/208 |
| 5,860,753 | 1/1999 | Beck et al. | 242/563.1 |

FOREIGN PATENT DOCUMENTS

9012111 11/1990 Germany .
4226417 2/1994 Germany .

*Primary Examiner*—Safet Metjahic
*Assistant Examiner*—Peter B. Kim
*Attorney, Agent, or Firm*—Smith Patent Office

[57] ABSTRACT

An installation guide mechanism is provided which allows a paper roll to be easily set onto a roll shaft of a paper magazine. A roll guide is connected with a roll shaft by inserting an insertion hole open at the rear end surface of a roll guide onto a holder ring at the front end of the roll shaft in a paper magazine. A tapered portion is arranged at the front end of the roll guide. After aligning a paper roll with the roll guide so that the tapered portion is inserted into the center hole of the paper roll, the paper roll is guided by the roll guide and is moved onto the roll shaft. A magazine guide also can be installed on a floor located under a magazine engaging port arranged on a bottom of an outer surface of a photographic printing machine. A side guide and a center guide are configured on the magazine guide. A pair of side rollers, two pairs of ground contact rollers and a pair of extruded members are included. As the paper magazine is pushed onto the magazine guide, the side roller is guided by the side guide and the extruded members are guided by the side guide surfaces of the center guide to adjust the direction of the paper magazine. The front roller and the rear roller installed on the bottom surface of the paper magazine are rolled along the center guide to reduce the moving resistance.

17 Claims, 9 Drawing Sheets

INSTALLATION GUIDE MECHANISM FOR PAPER ROLL AND GUIDE APPARATUS FOR PAPER MAGAZINE

BACKGROUND OF THE INVENTION

1. Field of the Invention

The present invention relates to an installation guide mechanism for a paper roll to be installed in a paper magazine. The present invention also relates to a guide apparatus for a paper magazine which guides the paper magazine with a large diameter roll of paper held therein to a magazine engaging port formed in an under side of an outer surface of a main body of a photographic printing machine.

2. Discussion of the Related Art

Generally, in a photographic printing machine which prints a negative image of a negative film strip onto a photographic printing paper (hereafter referred to as photographic paper), a paper magazine is engaged with a magazine engaging port arranged on an outer surface of a main body of a photographic printing machine. The photographic paper is drawn out of a paper roll held in the paper magazine and sent to an exposing section in the photographic printing machine so as to process the printing of the paper. Then the photographic paper is sent to a developing section thereof to be developed.

When the work of installing the paper into the paper magazine is taken into account, the size of the paper magazine mentioned above, i.e., the roll diameter of the paper roll held in the paper magazine which represents the length of the photographic paper, naturally is limited in size, and typically the length is usually over two hundred meters.

Therefore, when printing using the same size of photographic paper is used continuously in large quantities, the paper roll has to be replaced frequently.

To solve this problem, an oversize paper magazine is proposed which can hold a large sized roll of paper having a photographic paper length of some five hundred meters. The oversize paper magazine has begun to be used when the same size of negative film strips are printed in large quantities.

The oversize paper magazine described above has, on its one side, an opening with a lid to be opened and closed, and has, in its inside, a cantilevered roll shaft for supporting a paper roll. The paper roll is installed onto the roll shaft through the opening.

In the oversize paper magazine, since a free end of the roll shaft for supporting the paper roll is arranged inside the paper magazine, the paper roll having a weight over ten kilograms must be lifted and installed onto the roll shaft while the center hole of the paper roll core is being aligned with the roll shaft. Further the installation is typically implemented in a dark room and the installation of the paper roll has demanded a lot of time.

Since the roll shaft has a lock lever on its free end for operating a chuck to hold the inside of the paper roll set thereon, the paper roll must be carefully installed so that the end face of the paper roll is not damaged by the lock lever. Damage by the lock lever has been an annoying problem in prior systems.

Although casters are attached to the oversize magazine on the bottom surface thereof to make it movable, because of its heavy weight, about 70 kg with a new paper roll housed, the handling movement is not easy and it takes a large amount of time to engage it with the magazine engaging port.

SUMMARY OF THE INVENTION

The object of the present invention is to provide an installation guide mechanism allowing a paper roll to be easily installed onto the roll shaft of an oversize paper magazine. In order to achieve the above object effectively, the present invention has employed the following structure. A paper magazine has a roll shaft supported therein in a cantilever fashion. The paper magazine includes an opening with a lid on one side which can be opened and closed and it is structured and arranged so as to allow the paper roll to be installed onto the roll shaft through the opening, the front end of the roll shaft is detachably connected to a roll guide, the roll guide has a front end that protrudes out from the opening to guide the paper roll, and the roll guide is aligned with the roll shaft so as to be positioned on a common axis.

As one means for supporting the roll guide which is still freely attachable and detachable, a holder ring of a small diameter is arranged at the front end of the roll shaft and is inserted into an insertion hole which is open at the rear end surface of the roll guide.

To allow the paper roll to be inserted easily, the front end of the roll guide is tapered.

Another object of the present invention is to provide a guide apparatus for a paper magazine which enables an oversize paper magazine to be engaged easily and precisely with a magazine engaging port arranged on the photographic printing machine.

In order to achieve the above object effectively, the present invention employs a configuration in which a guide apparatus for a paper magazine comprises:

a magazine guide disposed on a floor located under a magazine engaging port arranged on an outer surface of a photographic printing machine, the magazine guide having a slope on one end and on a horizontal bottom plate whose other end faces an under side of the magazine engaging port, a center guide is disposed extending toward the magazine engaging port and a pair of side guides are disposed on both sides thereof, on one side of the center guide a slant guide surface is disposed and a horizontal roller guide surface is disposed following a top end of the slant guide surface;

two pairs of left and right ground contact rollers are located on front and rear portions of a bottom surface of the paper magazine;

a pair of left and right side rollers are disposed ahead of the ground contact rollers located in the front of the bottom surface, the side rollers being guided by the side guides;

a pair of protruded members comprising left and right members are installed on the bottom surface, the protruded members being guided by side guide surfaces of the center guide; and a front roller and a rear roller are disposed between the protruded members on the front and rear sides thereof respectively, the front roller and the rear roller being disposed so as to roll on the center guide, and whereby when the front rollers and the rear rollers are rolling on the roller guide surface of the center guide, each of the ground contact rollers is lifted up away from the upper surface of the bottom plate.

DETAILED DESCRIPTION OF THE PREFERRED EMBODIMENTS

Figure 1:
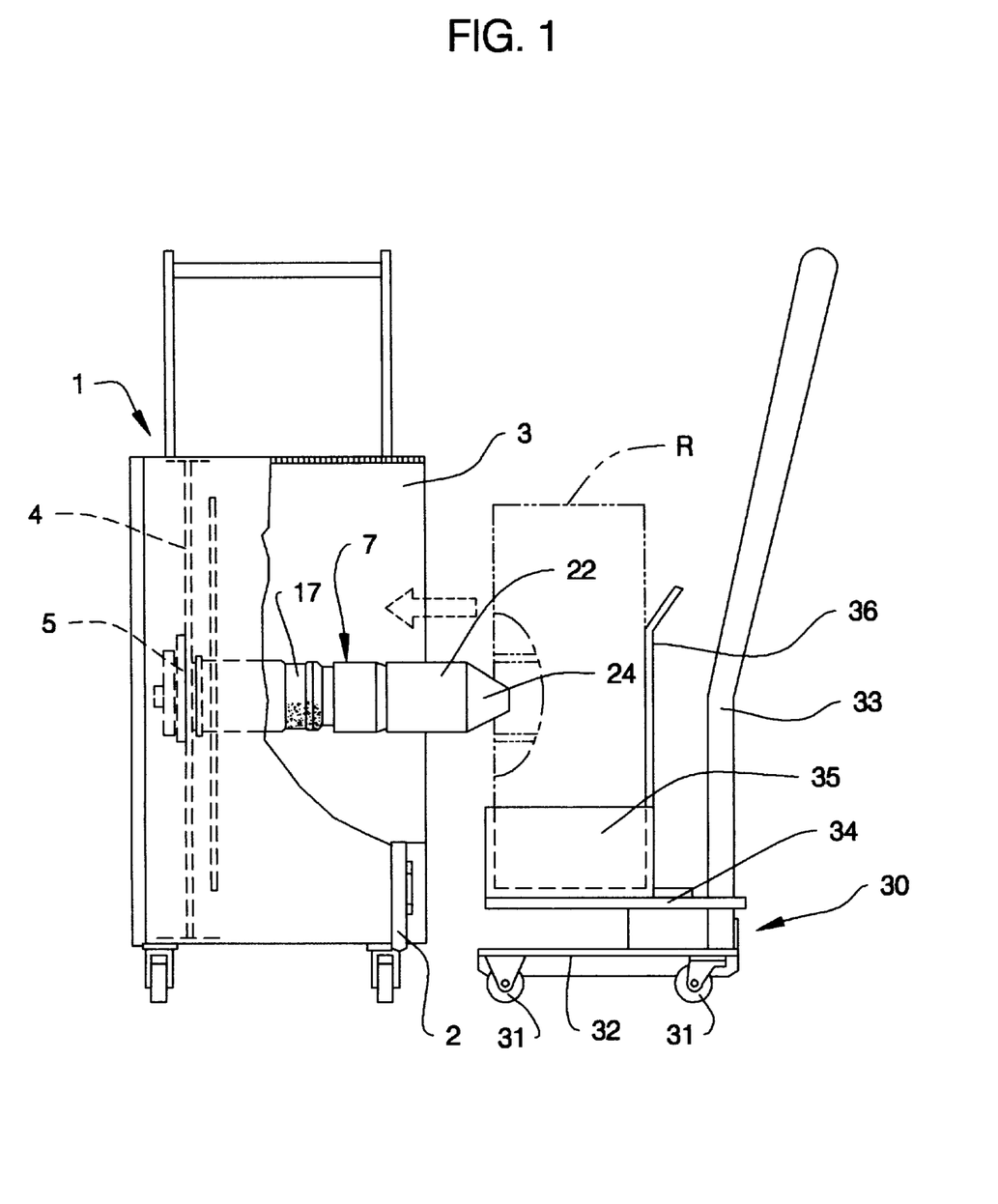
FIG. 1 is a partially cutaway front view of an installation guide mechanism according to an embodiment of the present invention.
Figure 2:
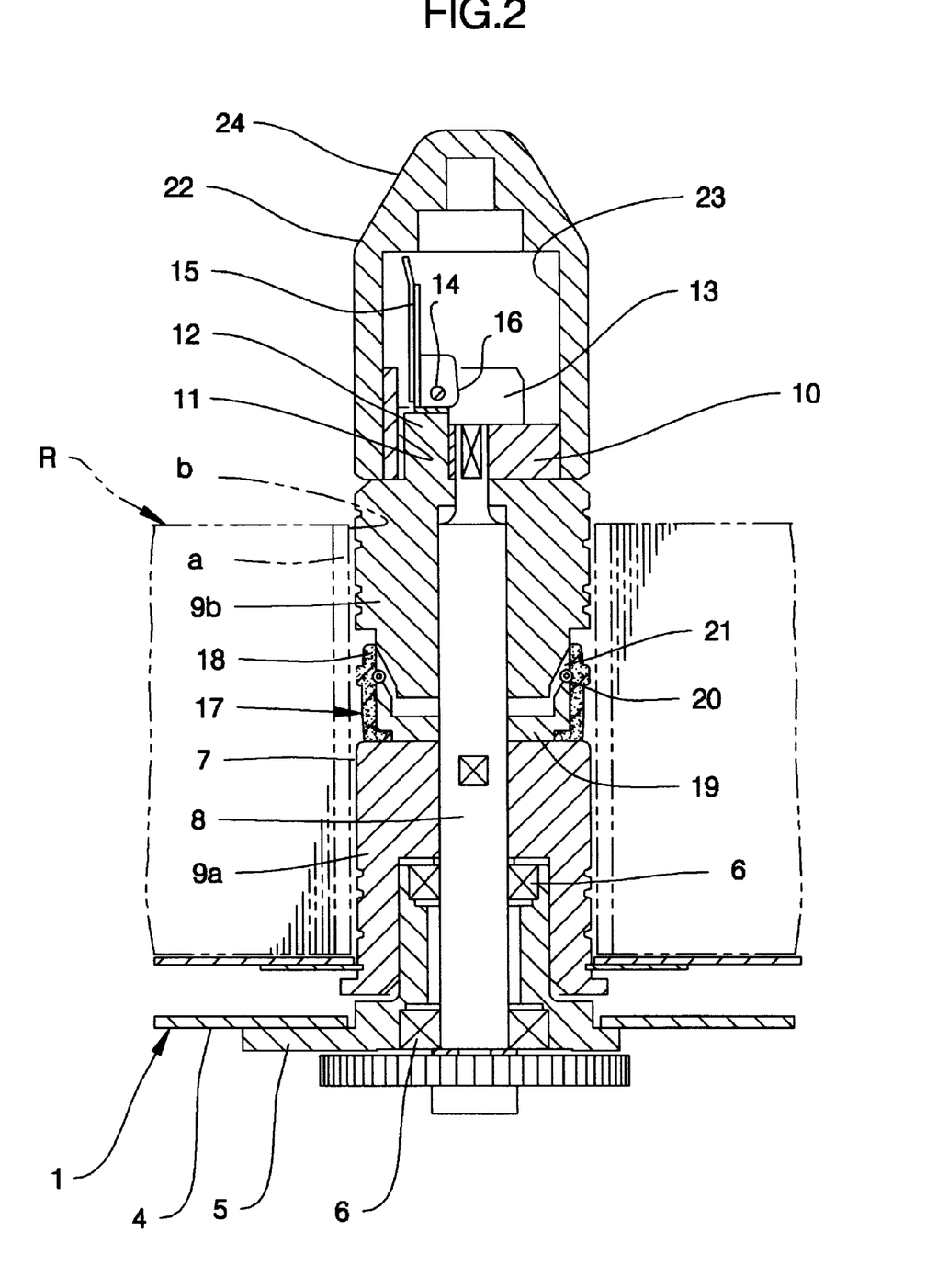
FIG. 2 is an enlarged cross-sectional view of the roll shaft portion of FIG. 1.

As shown in FIGS. 1 and 2, a paper magazine 1 has an opening 3 with a lid 2 to be opened and closed on its one side and a bearing housing 5 attached to a side plate 4 on the other side, and a roll shaft 7 is supported in a cantilever fashion by bearings 6 attached to the bearing housing 5.

The roll shaft 7 comprises a spindle 8 with its one end rotatably supported by the bearings 6 and two cylindrical bodies 9a, 9b arranged on the spindle. One cylindrical body 9a is fixed to the spindle 8 and the other cylindrical body 9b is supported movably in the direction of the axis of the spindle 8.

The free end of the spindle 8 penetrates through the cylindrical body 9b and a holder ring 10 is attached to this end of the spindle 8 protruding out from the cylindrical body 9b.

The outer diameter of the holder ring 10 is made smaller than that of the cylindrical body 9b. A protruding portion 12 formed on the end face of the cylindrical body 9b is inserted into a hole 11 eccentrically drilled through the holder ring 10 in the direction of the spindle 8.

The holder ring 10 has a two-fork piece 13 and a lock lever 15 is swingably supported around a pin 14 whose ends are supported by the two-fork piece 13.

The lock lever 15 has a thrust portion 16 to thrust the protruding portion 12 in the direction of the spindle. When the lock lever 15 is swung downwardly from the thrust release horizontal position, the thrust portion 16 pushes the protruding portion 12 and thereby moves the movable cylindrical body 9b toward the fixed cylindrical body 9a.

Between the two cylindrical bodies 9a, 9b is arranged a chuck 17 to hold the bore surface of the paper core "a" of a paper roll R which is outside the cylindrical bodies 9a, 9b.

The chuck 17 comprises an elastic ring 18 made of an elastic material such as rubber etc., a retainer ring 19 to fix the elastic ring 18 to the end surface of the fixed cylindrical body 9a, and a circular coil spring 20 installed inside the bore surface of the elastic ring 18. When the lock lever 15 is swung downwardly to move the movable cylindrical body 9b toward the fixed cylindrical body 9a, the elastic ring 18 expands in the direction of its own diameter. This is due to the thrusting effect that a tapered surface 21 formed on the movable cylindrical body 9b thrusts the coil spring 20 and thereby the chuck 17 holds the bore surface of the paper core "a".

The holder ring 10 is inserted into an insertion hole 23 opening at the rear end surface of a roll guide 22. The insertion hole 23 formed in the roll guide 22 is deep enough to house the horizontal lock lever 15 and the outer diameter of the roll guide 22 is almost equal to that of the cylindrical body 9b. The roll guide 22 has a tapered portion 24 at its front end and this tapered portion 24, protrudes out from the opening 3 of the paper magazine 1 when the roll guide 22 is attached to the holder ring 10.

The installation guide mechanism described in this embodiment has a configuration described as above. When a paper roll R is installed, the lid 2 of the paper magazine 1 is opened and the holder ring 10 is inserted into the insertion hole 23 of the roll guide 22 and it is connected to the roll guide 22.

On the other hand, the paper roll R to be installed is placed on a flatcar 30 as shown in FIG. 1 and the roll R is conveyed to where the paper magazine 1 is positioned.

Although any proper flatcar 30 may be employed, the flatcar 30 of the present embodiment comprises a flatcar frame 32 having a handle bar 33 thereon; a plurality of casters 31 attached to the flatcar frame 32; a mount table 34 to mount the paper roll R thereon; a pair of right and left supporting blocks 35 to support the outer and lower peripheral parts of the paper roll R; and a stand plate 36 to sustain the back of the paper roll R so as to prevent it from falling down.

Since the pair of right and left supporting blocks 35 are supported movably with respect to each other, different diameter paper rolls R can be held with the center of the paper roll R aligned with the same height of the roll shaft 7 of paper magazine 1 by adjusting the positions of the supporting blocks 35 in the right and left direction.

After the flatcar 30 supporting the paper roll R is conveyed to the position of the opening 3 of the paper magazine 1 and the paper roll R, having its center aligned with the center of the roll guide 22, is conveyed so that the front end of the roll guide 22 is inserted into the center hole "b" of the paper core "a" of the paper roll R, the paper roll R is pushed toward the roll shaft 7. As it is pushed, it is guided by the roll guide 22 so as to be set on the roll shaft 7.

During installation of the paper roll described above, since the lock lever 15 is housed inside the roll guide 22, the lock lever 15 will not touch and hurt the paper roll R, and no special care is necessary for installing the paper roll R.

Figure 3:
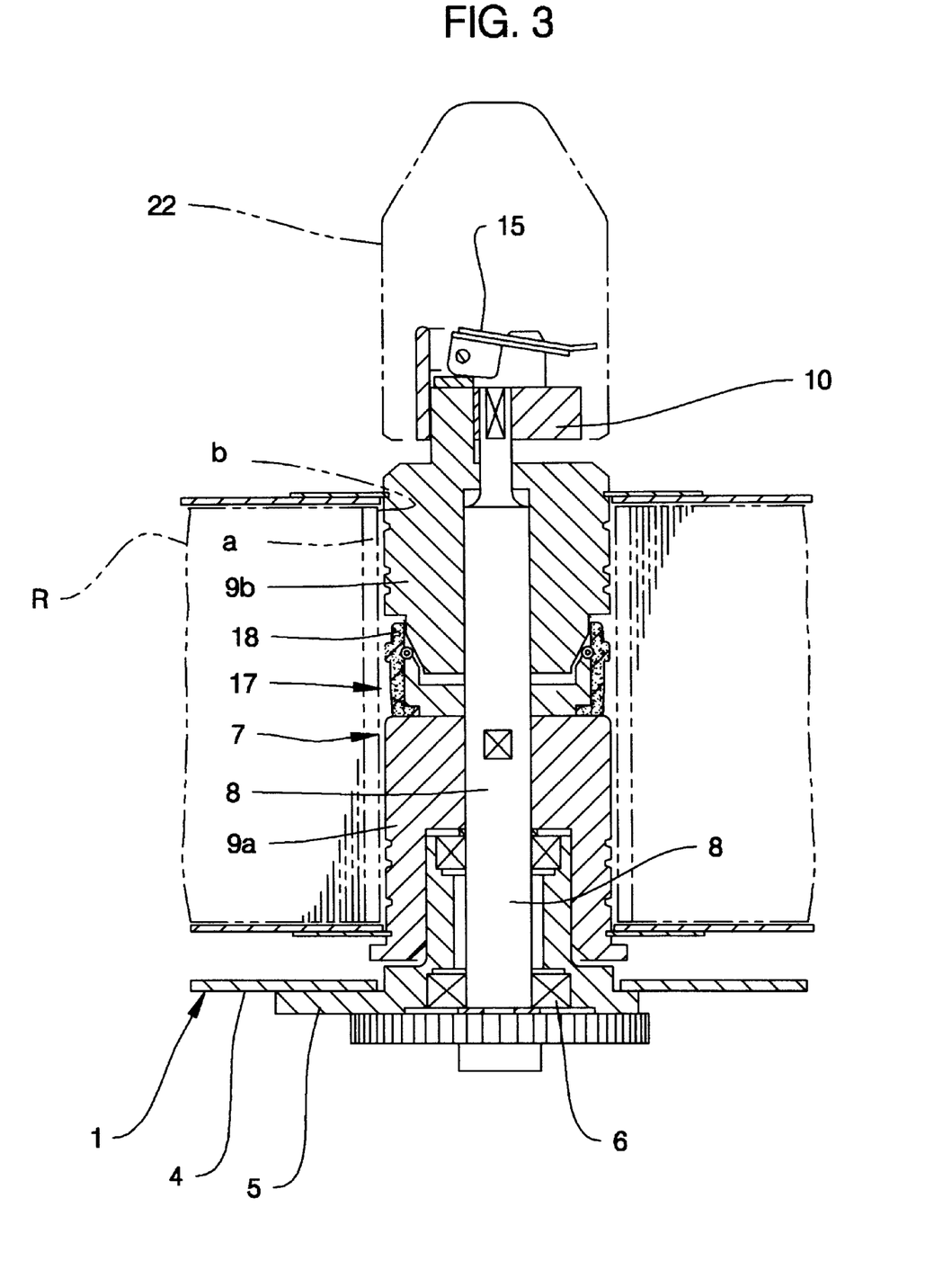
FIG. 3 is a cross-sectional view of an installed paper roll.

After installing the paper roll R, the roll guide 22 is removed as shown in FIG. 3, the lock lever 15 is folded, the paper roll is held by the chuck 17, and the lid 3 is rotated to close the opening 3.

Since the roll guide 22 is connected with the roll shaft 7 of the paper magazine 1 and the front end of the roll guide protrudes out from the opening 3 of the paper magazine 1, the paper roll center is allowed to be easily aligned with the roll shaft connected to the roll guide. After the alignment, since the paper roll is pushed towards the roll shaft, guided by the roll guide, and set onto the roll shaft, the paper roll can be easily set onto the roll shaft and this contributes to improved production.

Since the roll guide is attached by attaching the holder ring 10 onto the front end of the roll shaft, the roll guide can be easily attached and detached.

The tapered portion at the front end of the roll guide allows the paper roll to be easily inserted onto the roll guide. Even if there is a small distance gap between the center of the roll guide and the center of the paper roll, the paper roll can be smoothly inserted onto the roll guide.

Figure 4:
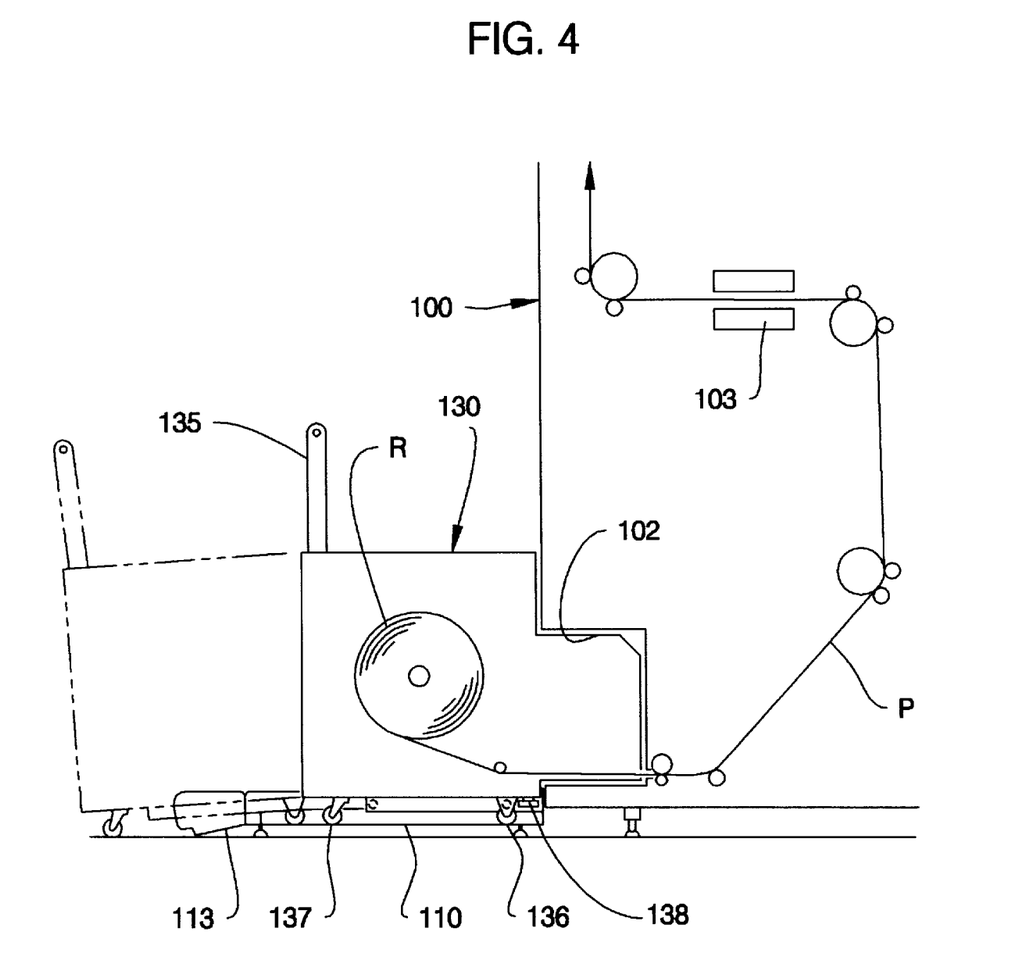
FIG. 4 is a schematic view of the guide apparatus according to the present invention.
Figure 5:
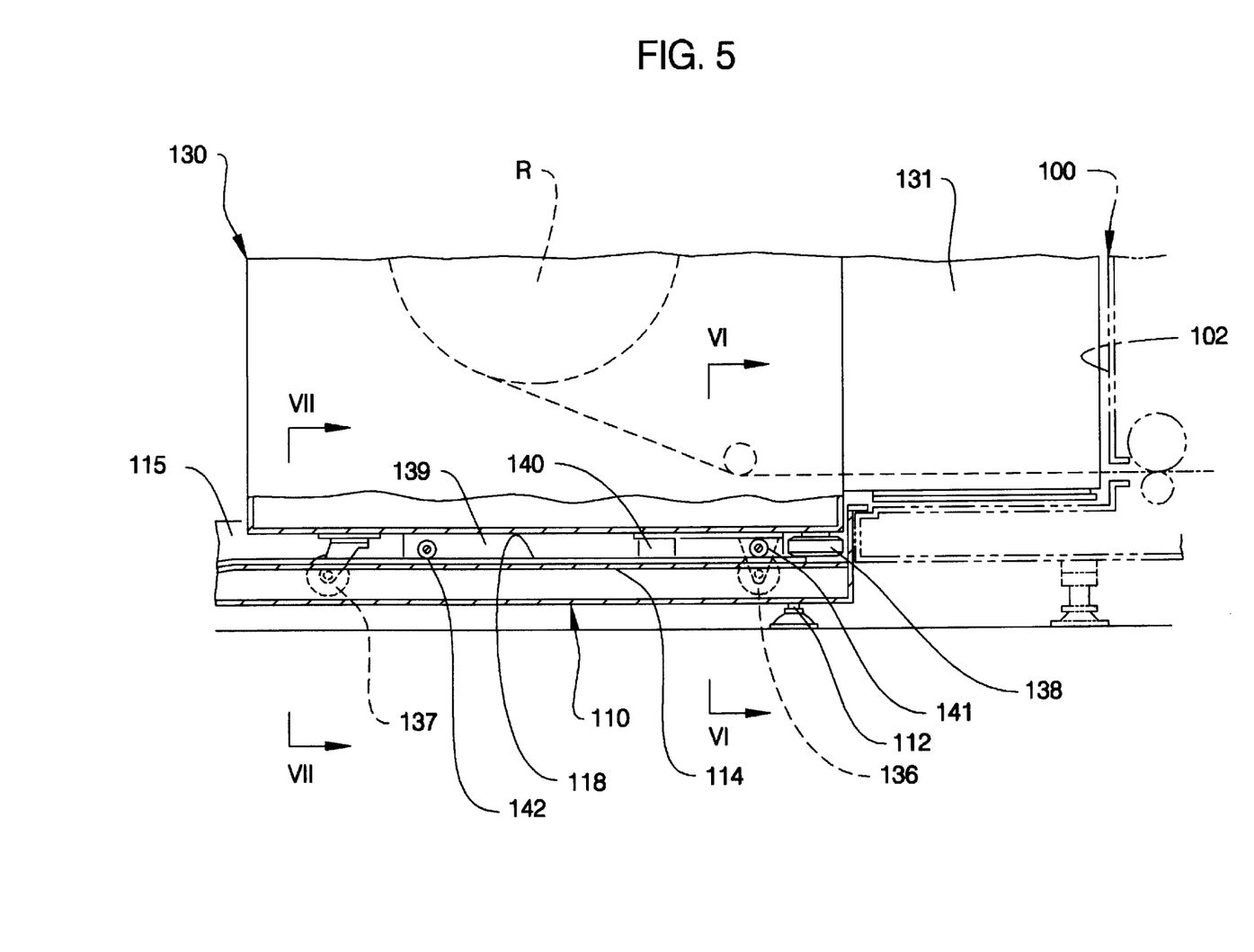
FIG. 5 is a cross-sectional view of the guide apparatus with the paper magazine installed according to the present invention therein.
Figure 6:
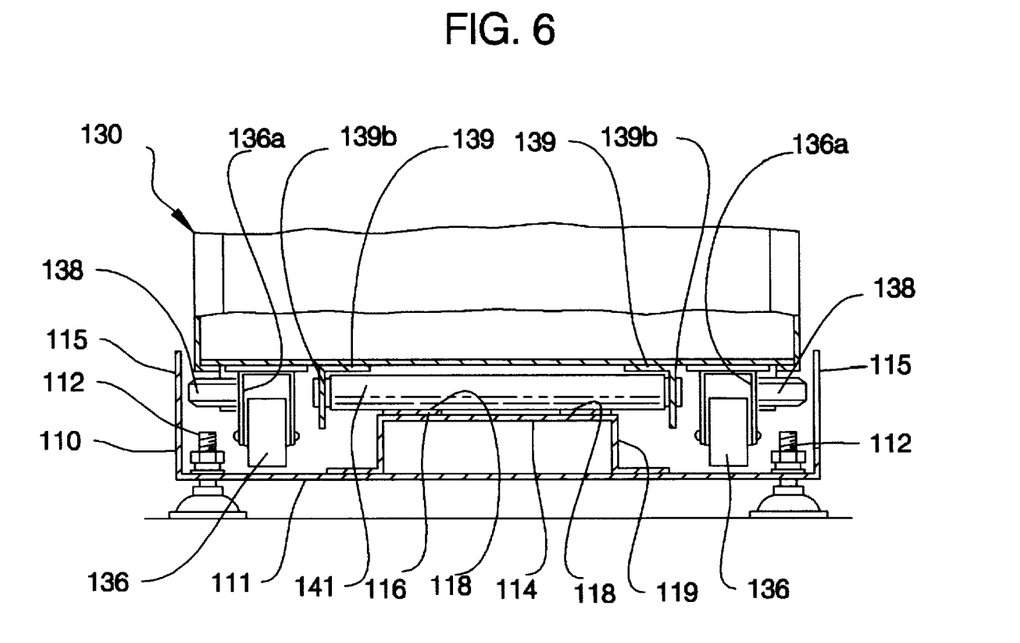
FIG. 6 is a cross-sectional view taken along the lines VI—VI of FIG. 5.
Figure 7:
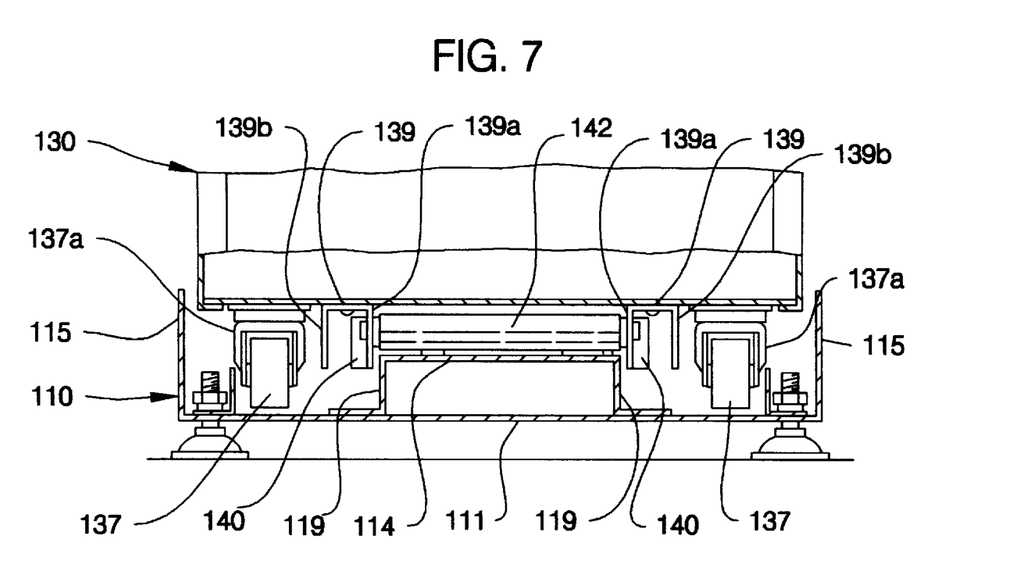
FIG. 7 is a cross-sectional view taken along the lines VII—VII of FIG. 5.

As shown in FIG. 4, on a bottom outer surface of a main body of a photographic printing machine 100 is formed a magazine engaging port 102. On the floor located under the magazine engaging port 102 is installed a magazine guide 110.

Figure 8:
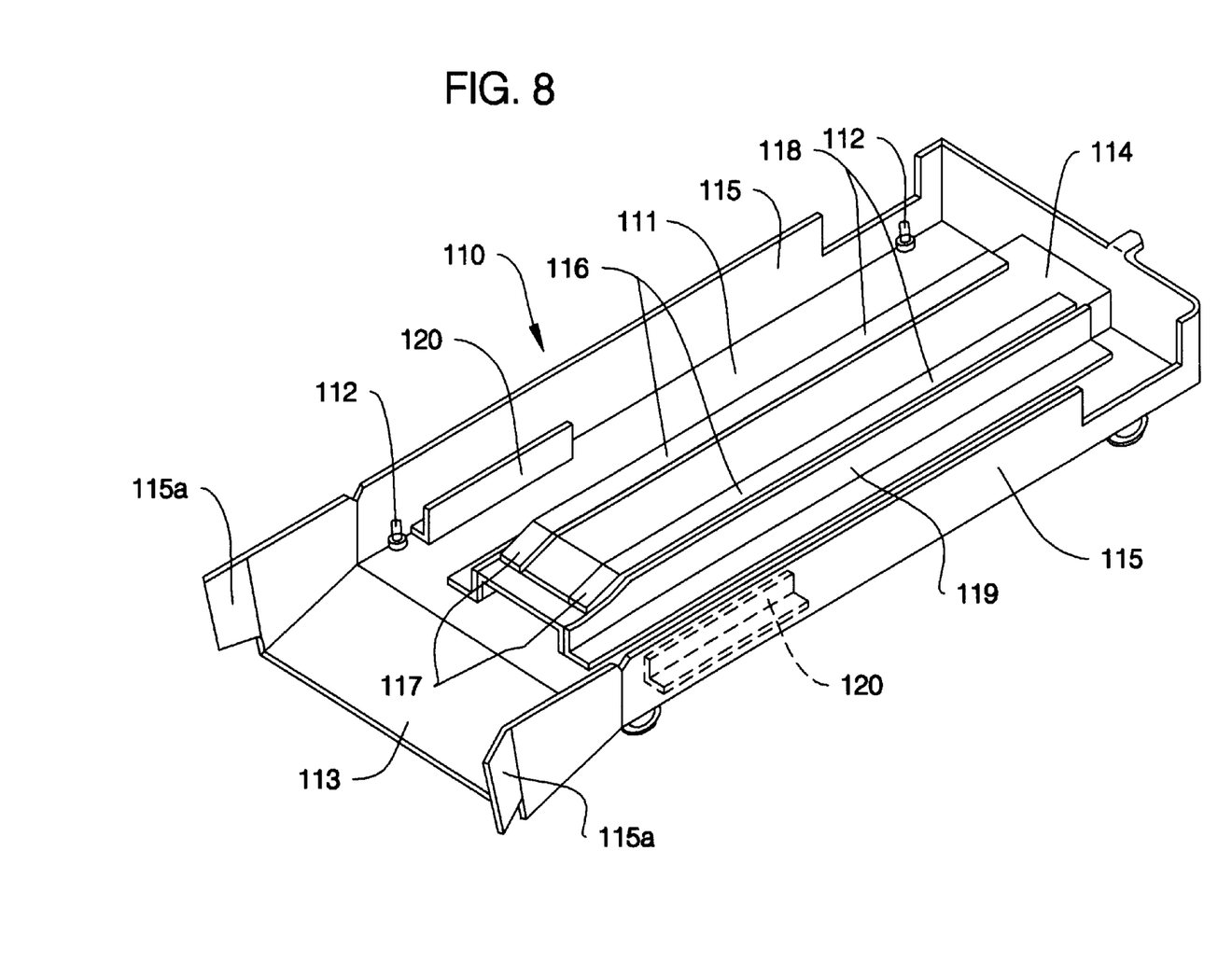
FIG. 8 is a perspective view of the magazine guide according to the present invention.

As shown in FIG. 8, the magazine guide 110 has a bottom plate 111, which is kept horizontally supported by a plurality of height adjusting bolts 112. One end of the bottom is formed to have a slope 113.

On the bottom plate 111 is a center guide 114 extending toward the magazine engaging port 102 and a side guide 115 disposed on both sides thereof. An end of the side guide 115 is formed as a slant guide plate 115a which is slanted outwardly.

On both sides of the upper surface of the center guide 114 are attached guide rails 116 made of strips. On the guide rails 116 are formed slant guide surfaces 117 on one side and horizontal roller guide surfaces 118 following the top end of the slant guide surface 117.

Further, on both sides of the center guide 114, parallel guide surfaces 119 are formed. Between the center guide 114 and the side guide 115, on one end side thereof, is attached an adjuster guide 120 which adjusts the direction of a ground contact roller described later.

Figure 9:
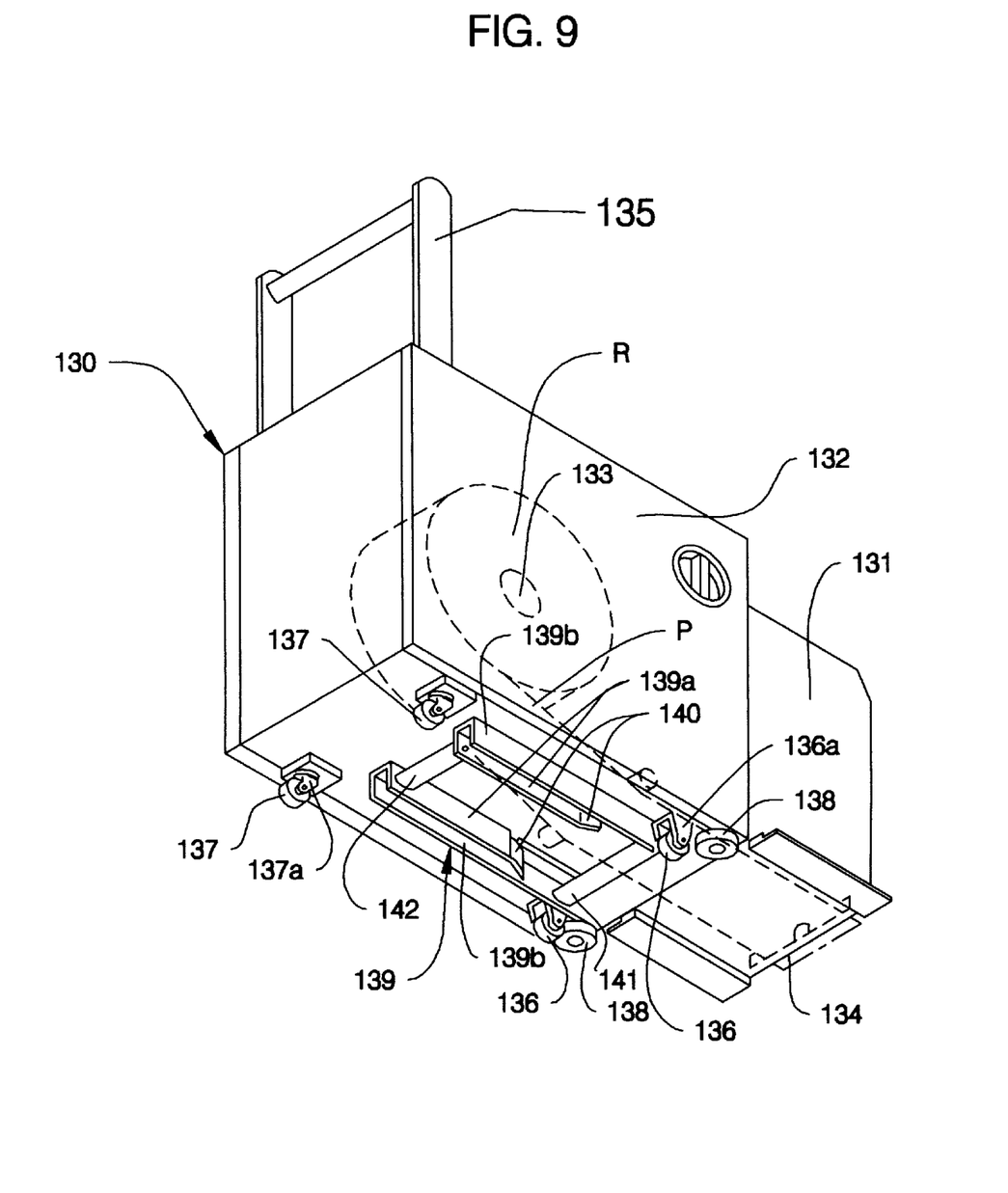
FIG. 9 is a perspective view of the paper magazine according to the present invention.

FIG. 9 shows a oversize paper magazine 130 to be engaged with the magazine engaging port 102. The paper magazine 130 has an engaging box 131 in the front to be inserted into the magazine engaging port 102.

Further, the paper magazine 130 has a lid 132 on one side, which can be opened and closed, and inside the lid is attached a roll support shaft 133. On the roll support shaft 133 a paper roll "R" is detachably supported. A photographic paper "P" drawn out of the paper roll "R" is sent into the photographic printing machine 100 through a paper outlet 134 formed on a front side of the engaging box 131.

An operation handle 135 is attached on the paper magazine 130. On a bottom surface of the paper magazine 130, two pairs of ground contact rollers 136, 137, each being composed of left and right rollers, are installed on the front and rear portions thereof respectively. A pair of side rollers 138 composed of left and right rollers are also installed ahead of the front ground contact rollers 136 and are guided by the side guide 115.

A roller bracket 136a which rotatably supports the front ground contact roller 136 is fixed onto the bottom surface of the paper magazine 130. On the other hand, a roller bracket 137a which rotatably supports the rear ground contact roller 137 is rotatably supported around an axis perpendicular to the bottom surface of the paper magazine 130. Each of the ground contact rollers is rotatable along the guide rail 116.

Further, on the bottom surface of the paper magazine 130, a pair of extruded members 139 composed of left and right members are provided. Each of the extruded members 139 has an inner plate 139a and an outer plate 139b. The distance between both inner plates 139a is slightly wider than a width of the center guide 114. The front end of the inner plate 139a is formed into a guide plate 140 and is slanted outwardly.

Between both front ends of the outer plates 139b and in nearly the same position with that of the front ground contact roller 136 with respect to a longitudinal direction, a front roller 141 is rotatably supported. Between both rear ends of the inner plates 139a, a rear roller 142 is rotatably supported.

The front roller 141 and the rear roller 142 are kept so as to be the same height. The lowest points of the outer surfaces of the front roller 141 and the rear roller 142 are positioned to be higher than the front ground contact roller 136 and the rear ground contact roller 137. When the front roller 141 and the rear roller 142 are supported on the roller guide surface 118 of the center guide 114, there exists clearance between each of the ground contact rollers 136, 137 and the upper surface of the bottom plate 111 of magazine guide 110.

The guide apparatus for the paper magazine according to the present invention is configured as described above. When the paper magazine 130 is to be used, the paper magazine is moved along the magazine guide 110 and the front engaging box 131 is inserted into the magazine engaging port 102.

When the paper magazine 130 is moved by hand operation and the front portion of the paper magazine 130 is pushed onto the bottom plate 111 of the magazine guide 110, the front ground contact roller 136 rotates on the slope 113.

At that time, if there is an offset between the center lines of the paper magazine 130 and the magazine guide 110 with respect to the width direction, the side roller 138 is guided by the slant guide plate 115a of the side guide 115.

Accordingly, the paper magazine 130 is moved on the magazine guide 110 while the offset is adjusted, and the front ground contact roller 136 begins to roll passing through the slope 113 and then along both side portions of the horizontal upper surface of the bottom plate 111.

Figure 10A:
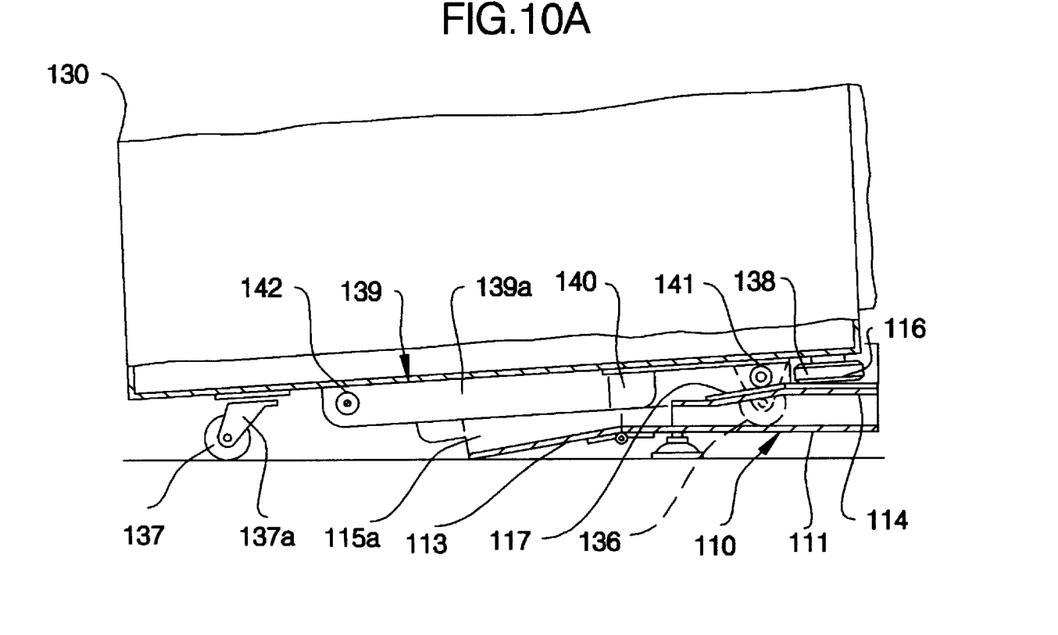
FIGS. 10A and 10B are cross-sectional views illustrating the steps of installing the paper magazine.

When the paper magazine 130 is pushed further, as shown in FIG. 10A, the front roller 141 is brought into contact with the slant guide surface 117 formed on the guide rail 116 of the center guide 114. When the paper magazine 130 is pushed in further from this position, the front roller 141 begins to rotate on the slant guide surface 117.

Figure 10B:
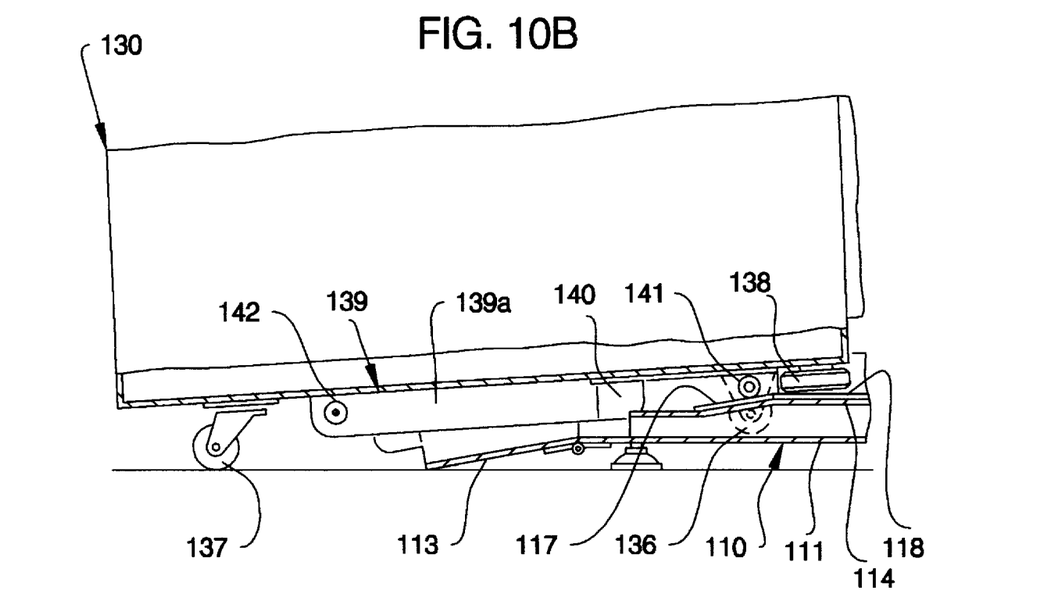

FIG. 10B shows the condition where the front roller 141 has gone up along the slant guide surface 117 and goes onto the horizontal roller guide surface 118 following the slant guide surface 117. In this condition, the front ground contact roller 136 is lifted up off the upper surface of the bottom plate 111 so as not to contact therewith.

When the front ground contact roller 136 loses contact with the bottom plate 111, the front end of the inner plate 139a of a pair of extruded members 139 faces one end of the center guide 114. When the paper magazine 130 is pushed in further, the inner plates 139a are guided by both side guide surfaces 119. Accordingly, when the paper magazine 130 is off a certain angle with respect to the center line of the magazine guide 110, the angle difference is adjusted by the movement of the inner plates 139a along both side guide surfaces 119.

At that time, the front roller 141 moves by rolling on the horizontal roller guide surface 118 of a pair of guide rails 116 so that the angle difference of the paper magazine 130 can be smoothly adjusted.

When the paper magazine 130 has been pushed into the position where the inner plate 139a is guided over the full length thereof by both side guide surfaces 119 of the center guide 114, the angle difference of the paper magazine 130 is completely adjusted. After the angle difference has been adjusted, when the rear ground contact roller 137 begins to rise up on and along the slope 113, the rear roller 142 begins to roll on the slant guide surface 117 formed on the guide rail 116 of the center guide 114, and, by the rolling of the rear roller 142, the rear ground contact roller 137 is lifted up.

When the rear roller 142 begins to move from the slant guide surface 117 to the horizontal roller guide surface 118, the rear ground contact roller 137 is kept out of contact with the bottom plate 111, and the engaging box 131 of the paper magazine 130 faces the magazine engaging port 102.

Therefore, when the paper magazine 130 is pushed in further, the engaging box 131 is securely inserted into the magazine engaging port 102 and the paper magazine 130 is precisely engaged with the magazine engaging port 102.

After the paper magazine 130 has been engaged, the photographic paper "P" drawn out of the paper roll "R" is sent into an exposing section 103 of the photographic printing machine 102 to be exposed.

As described, when the paper magazine is pushed onto the magazine guide, the offset between the center lines of the paper magazine and the magazine guide with respect to the width direction can be adjusted by bringing the side roller into contact with the side guide. The angle difference of the paper magazine can be adjusted by bringing the extruded members into contact with the side guide surfaces of the center guide and the paper magazine can be precisely and simply engaged with the magazine engaging port.

Furthermore, when the paper magazine is pushed onto the magazine guide, the front roller and the rear roller roll along the roller guide surface on the center guide and each of the ground contact rollers is maintained out of contact with the upper surface of the bottom plate. This reduces the moving resistance of the paper magazine and the angle difference of the paper magazine can be easily adjusted. In addition, the paper magazine can be easily moved to the magazine engaging port.

Although the present invention has been fully described by way of example with reference to the accompanying drawings, it is to be understood that various changes and modifications will be apparent to those skilled in the art. Therefore, unless such changes depart from the scope of the invention as defined by this specification and claims, they should be construed as being included herein.

What is claimed is:

1. An installation guide mechanism for mounting a paper roll comprising:
   a paper magazine having a roll shaft supported therein in a cantilever fashion, said paper magazine including an opening with a lid on one side which can be opened and closed and structured and arranged so as to allow the paper roll to be installed onto said roll shaft through the opening, a front end of said roll shaft being detachably connected to a roll guide, said roll guide having a front end that protrudes out from the opening to guide the paper roll, said roll guide having an outer diameter that is smaller than an inner diameter of the paper roll so that said roll guide will guide the paper roll during mounting of the paper roll, and said roll guide being aligned with said roll shaft so as to be positioned on a common axis.

2. An installation guide mechanism for mounting a paper roll as defined in claim 1, wherein said roll guide has an insertion hole opening at one end of said roll guide, and
   further comprising a holder ring having a diameter smaller than a diameter of the insertion hole opening, said holder ring being detachably inserted in the insertion hole opening.

3. An installation guide mechanism for mounting a paper roll as defined in claim 1, wherein said roll guide has a tapered portion at its front end.

4. An installation guide mechanism for mounting a paper roll as defined in claim 2, wherein said roll guide has a tapered portion at its front end.

5. An installation guide mechanism as defined in claim 1, further comprising a holding member for holding the paper roll on said roll shaft when the paper roll has been mounted on said roll shaft.

6. An installation guide mechanism as defined in claim 5, further comprising an operating mechanism disposed at an end of said roll shaft, said operating mechanism being sized so as to be disposed inside said roll guide when said roll guide is attached to said roll shaft.

7. An installation guide mechanism as defined in claim 6, wherein said holding member further comprises a chuck disposed adjacent to one part of said roll shaft, a coil spring disposed adjacent to said chuck and an elastic ring disposed around outer surfaces of said chuck and said elastic ring so that said elastic ring can contact the inner diameter of the paper roll when the paper roll has been mounted on said roll shaft and said operating mechanism is moved to a locked position.

8. An installation guide mechanism as defined in claim 2, further comprising a holding member for holding the paper roll on said roll shaft when the paper roll has been mounted on said roll shaft.

9. An installation guide mechanism as defined in claim 8, further comprising an operating mechanism disposed at an end of said roll shaft, said operating mechanism being sized so as to be disposed inside said roll guide when said roll guide is attached to said roll shaft.

10. An installation guide mechanism as defined in claim 9, wherein said holding member further comprises a chuck disposed adjacent to one part of said roll shaft, a coil spring disposed adjacent to said chuck and an elastic ring disposed around outer surfaces of said chuck and said elastic ring so that said elastic ring can contact the inner diameter of the paper roll when the paper roll has been mounted on said roll shaft and said operating mechanism is moved to a locked position.

11. An installation guide mechanism as defined in claim 3, further comprising a holding member for holding the paper roll on said roll shaft when the paper roll has been mounted on said roll shaft.

12. An installation guide mechanism as defined in claim 11, further comprising an operating mechanism disposed at an end of said roll shaft, said operating mechanism being sized so as to be disposed inside said roll guide when said roll guide is attached to said roll shaft.

13. An installation guide mechanism as defined in claim 12, wherein said holding member further comprises a chuck disposed adjacent to one part of said roll shaft, a coil spring disposed adjacent to said chuck and an elastic ring disposed around outer surfaces of said chuck and said elastic ring so that said elastic ring can contact the inner diameter of the paper roll when the paper roll has been mounted on said roll shaft and said operating mechanism is moved to a locked position.

14. An installation guide mechanism as defined in claim 4, further comprising a holding member for holding the paper roll on said roll shaft when the paper roll has been mounted on said roll shaft.

15. An installation guide mechanism as defined in claim 14, further comprising an operating mechanism disposed at an end of said roll shaft, said operating mechanism being sized so as to be disposed inside said roll guide when said roll guide is attached to said roll shaft.

16. An installation guide mechanism as defined in claim 15, wherein said holding member further comprises a chuck disposed adjacent to one part of said roll shaft, a coil spring disposed adjacent to said chuck and an elastic ring disposed around outer surfaces of said chuck and said elastic ring so that said elastic ring can contact the inner diameter of the paper roll when the paper roll has been mounted on said roll shaft and said operating mechanism is moved to a locked position.

17. A guide apparatus for a paper magazine comprising:
    a magazine guide disposed on a floor located under a magazine engaging port arranged on an outer surface of a photographic printing machine, said magazine guide having a slope on one end and on a horizontal bottom plate whose other end faces an under side of said magazine engaging port, a center guide is disposed extending toward said magazine engaging port and a pair of side guides are disposed on both sides thereof, on one side of said center guide a slant guide surface is disposed and a horizontal roller guide surface is disposed following a top end of said slant guide surface;

two pairs of left and right ground contact rollers are located on front and rear portions of a bottom surface of the paper magazine;

a pair of left and right side rollers are disposed ahead of said ground contact rollers located in the front of the bottom surface, said side rollers being guided by said side guides;

a pair of protruded members comprising left and right members are installed on the bottom surface of said paper magazine, said protruded members being guided by side guide surfaces of said center guide; and a front roller and a rear roller are disposed between said protruded members on the front and rear sides thereof respectively, said front roller and said rear roller being disposed so as to roll on said center guide; and whereby when said front rollers and said rear rollers are rolling on the roller guide surface of the center guide, each of said ground contact rollers is lifted up away from the upper surface of the bottom plate.

* * * * *